US007388466B2

(12) United States Patent
Ghabra et al.

(10) Patent No.: US 7,388,466 B2
(45) Date of Patent: Jun. 17, 2008

(54) INTEGRATED PASSIVE ENTRY AND REMOTE KEYLESS ENTRY SYSTEM

(75) Inventors: Riad Ghabra, Dearborn Heights, MI (US); Qingfeng Tang, Novi, MI (US); Yi Luo, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 314 days.

(21) Appl. No.: 10/999,503

(22) Filed: Nov. 30, 2004

(65) Prior Publication Data

US 2006/0114100 A1 Jun. 1, 2006

(51) Int. Cl.
*H04Q 9/00* (2006.01)
*H04Q 5/22* (2006.01)
*H01H 47/00* (2006.01)

(52) U.S. Cl. .................. 340/5.61; 340/5.72; 340/10.34; 307/10.5

(58) Field of Classification Search ............... 340/5.61, 340/5.72, 10.34; 307/10.5
See application file for complete search history.

(56) References Cited

U.S. PATENT DOCUMENTS

| | | | | |
|---|---|---|---|---|
| 5,973,611 | A | 10/1999 | Kulha et al. | |
| 6,034,617 | A * | 3/2000 | Luebke et al. | 340/5.62 |
| 6,243,022 | B1 | 6/2001 | Furukawa | |
| 6,323,566 | B1 | 11/2001 | Meier | |
| 6,437,683 | B1 * | 8/2002 | Wolf et al. | 340/5.61 |
| 6,538,560 | B1 * | 3/2003 | Stobbe et al. | 340/5.72 |
| 6,583,715 | B1 | 6/2003 | Benzie et al. | |
| 6,617,961 | B1 | 9/2003 | Janssen et al. | |
| 6,658,328 | B1 | 12/2003 | Alrabady et al. | |
| 6,714,119 | B1 | 3/2004 | Mindl et al. | |
| 6,924,735 | B2 * | 8/2005 | Ueda et al. | 340/426.28 |
| 7,142,090 | B2 * | 11/2006 | Ueda et al. | 340/5.61 |
| 2001/0033222 | A1 | 10/2001 | Nowottnick et al. | |
| 2004/0049325 | A1 | 3/2004 | Flick et al. | |

FOREIGN PATENT DOCUMENTS

| | | |
|---|---|---|
| DE | 19902797 | 6/2000 |
| DE | 19859255 | 7/2000 |
| EP | 0903456 | 3/1999 |
| EP | 1077301 | 2/2001 |

* cited by examiner

*Primary Examiner*—Brian Zimmerman
*Assistant Examiner*—Scott Au
(74) *Attorney, Agent, or Firm*—MacMillan, Sobanski & Todd, LLC

(57) ABSTRACT

A vehicle communication system mounted in the vehicle and a portable fob for carrying by a user are provided. The vehicle communication system comprises a trigger generator, an LF transmitter for broadcasting an LF wakeup signal, and an RF transmitter for broadcasting a UHF status message including vehicle status data. The vehicle communication system broadcasts a challenge signal after the LF wakeup signal. The portable fob comprises an LF receiver responsive to the LF wakeup signal, a fob controller for determining response data, and an RF transmitter for broadcasting a UHF response signal incorporating the response data. The portable fob further comprises an RF receiver for receiving the vehicle status data, a visual display for visually reproducing the vehicle status data, and a manual input key for activating the fob controller to generate a remote control message. The RF transmitter in the portable fob broadcasts a UHF control signal incorporating the remote control message. The vehicle communication system further comprises an RF receiver responsive to the UHF control signal and a base controller for initiating a corresponding remote control function in response to the UHF control signal.

12 Claims, 3 Drawing Sheets

FOB 12

Vehicle 10

INTEGRATED PASSIVE ENTRY AND REMOTE KEYLESS ENTRY SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to remote convenience and security systems for automotive vehicles, and, more specifically, to a wireless communication system for integrating functions of a two-way remote keyless entry system and a passive entry system.

Remote keyless entry (RKE) systems for vehicles have been in use for many years. These systems provide safety and convenience for a user entering or exiting a vehicle. Some of the typical features offered by these systems allow the user to lock/unlock doors and arm/disarm auto theft systems in a remote manner. In addition, remote starting of the engine and remote control of the climate control temperature setting after starting are commercially available. Typical RKE systems utilize a key fob with a radiofrequency (RF) transmitter which transmits to a base station in the vehicle. When the user is within range, the user actuates a corresponding button on the key fob to send a lock, unlock, or engine start command, for example. Two-way communication is typically implemented in remote start systems so that the user carrying the portable fob can be informed of the status of the vehicle (e.g., engine running status, door lock status, and temperature status). Thus, a two-way fob includes a visual display (e.g., LED indicator lights or an LCD graphical display panel) to convey the information to the user.

One disadvantage of this type of system is that the user must manually actuate the key fob to achieve the desired result. In an attempt to eliminate this disadvantage, passive entry systems, which operate in a hands-free manner, are being introduced. In order to avoid excessive battery consumption by periodic radio transmission from the fob, the approach of the user to the vehicle is usually sensed by the vehicle, which then wakes up the fob to perform a security check before actuating a passive entry function. Is it known, for example, to sense the presence of a user who is attempting entry into a locked vehicle via a particular door by detecting the lifting of the door handle. Using a low frequency (LF) wireless signal, the vehicle then interrogates the area around the door for a key fob containing a valid security ID code.

Passive entry communication operates over a much shorter range than RKE communication (e.g., 1 meter as opposed to 30 meters). Therefore, an LF signal (e.g., 134 kHz) is used for passive entry while a much higher frequency RF signal (e.g., 315 MHz or 433 MHz) is used for RKE since the LF signal decays over a shorter range. In addition, transponders operative at LF frequencies are readily available. As used herein, LF frequencies range from about 30 kHz to about 300 kHz. RF signals used in RKE systems are typically in the UHF band from about 300 MHz to about 3 GHz.

Security ID codes for validating a particular fob for accessing a passive entry function typically include rolling code encryption in order to deter code grabbing and relay attacks by potential thieves. Due to the low frequency signals used by passive entry systems, the exchanging of challenge and response signals used by a rolling code system has transpired using a data rate which is lower than the data rate for performing similar exchanges by RKE systems using RF signals. A slow data rate can result in problems because it is necessary to quickly validate a fob carried by the user after beginning to lift a door handle so that a door unlock mechanism can be activated before the door handle moves beyond an appropriate position.

SUMMARY OF THE INVENTION

The present invention has advantages of added convenience, faster response times, and increased security as results of integrating functionality of a passive entry system with a two-way RKE system having an active display.

In one aspect of the invention, an integrated passive entry and remote keyless entry system is provided for a vehicle, wherein the system comprises a vehicle communication system mounted in the vehicle and a portable fob for carrying by a user. The vehicle communication system comprises a trigger generator, an LF transmitter responsive to the trigger generator for broadcasting an LF wakeup signal, and an RF transmitter for broadcasting a UHF status message including vehicle status data to the portable fob. The vehicle communication system broadcasts a challenge signal to the portable fob after the LF wakeup signal. The portable fob comprises an LF receiver responsive to the LF wakeup signal, a fob controller for determining response data according to the challenge signal, and an RF transmitter for broadcasting a UHF response signal incorporating the response data. The portable fob further comprises an RF receiver for receiving the vehicle status data, a visual display for visually reproducing the vehicle status data, and a manual input key for activating the fob controller to generate a remote control message. The RF transmitter in the portable fob broadcasts a UHF control signal incorporating the remote control message. The vehicle communication system further comprises an RF receiver responsive to the UHF control signal and a base controller for initiating a corresponding remote control function in response to the UHF control signal.

DETAILED DESCRIPTION OF PREFERRED EMBODIMENTS

Figure 1:
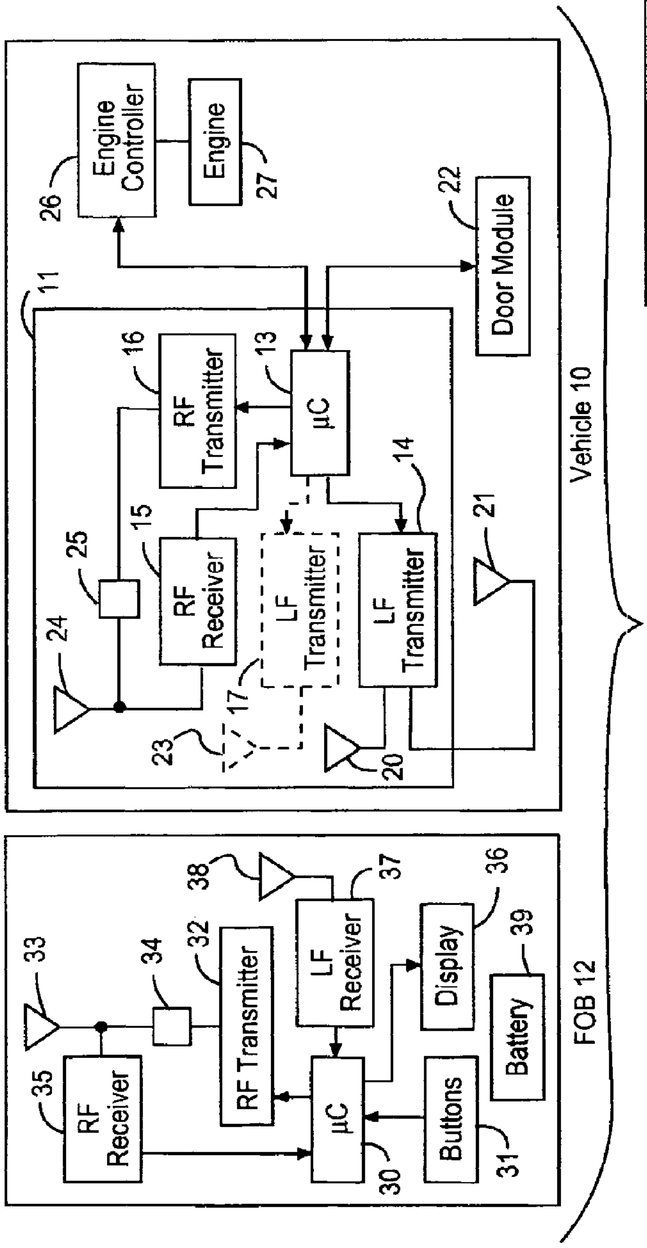
FIG. 1 is a schematic, block diagram of one preferred embodiment of an integrated two-way RKE and passive entry system according to the present invention.

Referring to FIG. 1, a vehicle 10 includes a base station or vehicle communication module 11 for communicating with a remote portable fob 12. Base station 11 includes a microcontroller 13 coupled to an LF transmitter 14, an RF receiver 15, and an RF transmitter 16. In certain embodiments of the present invention, additional LF transmitters or LF antennas may be provided such as an LF transmitter 17. The additional transmitters or antennas may be located in vehicle 10 remotely from base station 11 at an entry zone being monitored by a passive entry system, for example. A single LF transmitter 14 may also use a plurality of LF antennas at respective locations within the vehicle such as an LF antenna 20 deployed in base station 11 and an LF antenna 21 disposed near a door module 22 in vehicle 10 (e.g., in a side view mirror housing). Door module 22 is coupled to microcontroller 13 and may preferably include a sensing switch for detecting the lifting of a door handle and a power lock mechanism for remotely locking and unlocking a corresponding door lock. If a separate LF transmitter 17 is used, an LF antenna 23 is coupled thereto.

An RF antenna 24 is coupled to RF receiver 15 as well as to RF transmitter 16 through a matching circuit 25. Microcontroller 13 in base station 11 is coupled to an engine controller 26 for controlling an engine 27. Door module 22 and engine controller 26 act as function actuators for implementing RKE commands received by base station microcontroller 13. Microcontroller 13 receives vehicle status data from engine controller 26 (e.g., to confirm that the engine has successfully started in response to a remote engine start command) and from door module 22 (e.g., to confirm locking of the vehicle doors). The vehicle status data can be sent to portable fob 12 within a vehicle status message as part of a confirmation following execution of particular RKE commands, for example.

Portable fob 12 includes a microcontroller 30 coupled to input buttons 31 typically including separate push buttons for activating RKE commands for locking and unlocking doors, remotely starting or stopping an engine, panic alarm, and others. An RF transmitter 32 is coupled to an antenna 33 through a matching network 34. RKE commands initiated by depressing a push button 31 are broadcast by RF transmitter 32 and antenna 33. An RF receiver 35 is coupled to antenna 33 and microcontroller 30 for receiving UHF status messages broadcast by base station 11, such as engine running status for a remote start function. A display 36 is coupled to microcontroller 30 for displaying vehicle status data from a status message to a user.

An LF receiver 37 is coupled to microcontroller 30 and to an LF antenna 38 for detecting wakeup signals broadcast from vehicle 10. A battery 39 in fob 12 supplies electrical power to all the other components of fob 12 during normal operation.

In operation, a typical passive entry sequence begins when a door handle switch in door module 22 generates a trigger pulse provided to microcontroller 13 resulting in executing a trigger generation function within microcontroller 13. In response to trigger generation, LF transmitter 14 is activated in order to generate an LF wakeup signal to activate LF receiver 37 in fob 12 via antennas 20 and 38. The LF wakeup signal is also used to localize the fob based on which LF transmitter antenna 20 or 21 generates the strongest received LF wakeup signal in fob 12. The LF wakeup signal has a known format including an operation code for identifying the signal as a wakeup signal and preferably also including an antenna identifier unique to the antenna being used to transmit each LF wake-up signal. Localization of the fob is necessary to ensure that a person carrying an authorized fob is properly located in the area where the passive function is being requested (e.g., located outside the door with the triggering door handle for a passive entry function and located in the passenger compartment for a passive engine start function).

LF receiver 37 preferably includes circuitry for measuring a received signal strength indicator (RSSI) at which the LF wakeup signal is received. The awakened microcontroller 30 stores the RSSI data as part of response data to be sent back to base station 11. Also after being awakened, RF receiver 35 is activated in order to receive an expected challenge signal from base station 11 as part of a conventional challenge/response validation sequence. For example, microcontroller 13 in base station 11 generates a random number to be used as a seed number in a secret mathematical transformation that is also known to microcontroller 30 in fob 12. RF transmitter 16 in base station 11 is used broadcast a UHF challenge signal including the random number. RF receiver 35 in fob 12 receives the UHF challenge signal and microcontroller 30 passes the random number through the known mathematical transformation. The resulting transformed number is included in response data together with the RSSI signal and a fob identifier for inclusion in a UHF response signal broadcast via RF transmitter 32 and antenna 33. The UHF challenge and response signals are sent with a much shorter time delay than if they were sent at the low frequency. The challenge and response may both be sent at 9.6 k baud, for example. The UHF response signal is received by RF receiver 15 via antenna 24 in base station 11 and is processed by microcontroller 13 in a known manner. For instance, microcontroller 13 checks the transformed number as received from fob 12 with its own results of the transformation and determines the UHF response signal to be valid if the transformed numbers match.

Fob 12 and base station 11 also function to provide remote keyless entry functions in a conventional manner. Thus, when a user presses a manual input key (i.e., push button) 31 for a desired remote control function, a UHF control signal incorporating a remote control message having a corresponding function identifier and a pre-assigned fob ID is broadcast. When base station 11 receives a UHF control signal, it validates the fob ID and any security codes and then initiates the remote control function via a vehicle message sent from base station controller 13 to an actuator such as door module 22 or engine controller 26. Typical remote control commands include locking all doors, unlocking a driver's door, unlocking all doors, unlocking a trunk, activating a panic alarm, remotely starting an engine, activating a climate control, deactivating an engine, deactivating a climate control, and requesting vehicle status data to be provided in a UHF status message.

Two-way RKE communication may be initiated by microcontroller 13 automatically after executing certain remote control actions to provide the status data (e.g., engine running status or door lock status) in a UHF status message. The status message is broadcast by RF receiver 15 via antenna 24 to antenna 33 and RF receiver 35 and preferably includes an identifier for properly addressing fob 12 so that information presented by display 36 corresponds to the correct vehicle. The UHF status message may also be prompted by sending a remote control request signal from fob 12.

Figure 2:
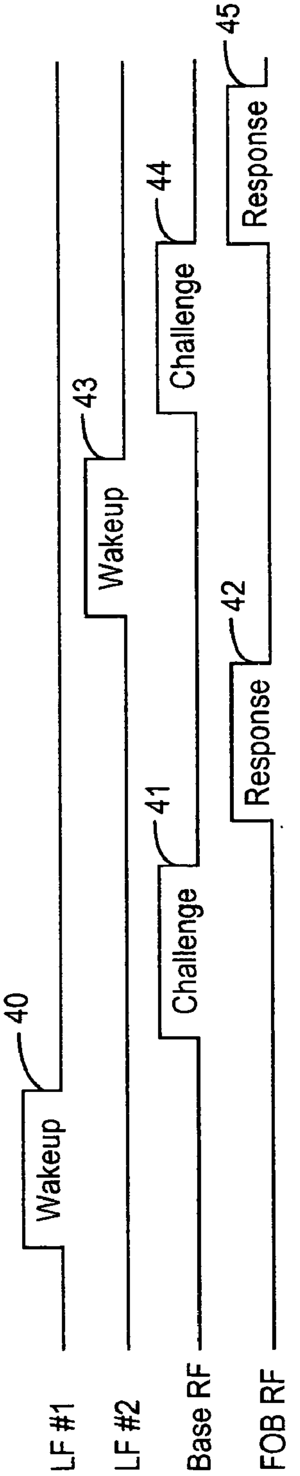
FIG. 2 is a timing diagram of signal exchanges in one preferred embodiment of the invention.

FIG. 2 shows a first preferred embodiment for localizing a fob in a passive entry sequence wherein it is desired to determine whether the fob is outside the vehicle in the vicinity of a particular door (i.e., when a door unlock request is initiated by a trigger signal from the lifting of a door handle) or inside the vehicle (i.e., a passive engine start sequence is triggered by a user pressing an engine start switch inside the vehicle). A first LF wakeup signal 40 is generated from a first antenna preferentially transmitting to a first area with respect to the vehicle (e.g., outside the vehicle adjacent to a particular door or other closure such as a trunk). After waiting an amount of time sufficient to allow the fob to awaken, the base station sends a challenge signal 41 via the base station RF transmitter and antenna. If the fob is in fact in the first area being preferentially transmitted to, then after receiving the challenge signal and formulating response data the fob RF transmitter sends a UHF response signal 42. When the fob is located in the area, then the response includes RSSI data showing strong reception. If outside the first area, then the RSSI data will reflect a weak signal. If the fob is not close enough to the target area, the wakeup signal will not have been received and there will no response to the challenge signal at all. In order to poll an additional location, an LF wakeup signal 43 is sent via a second LF antenna preferentially transmitting to a second area (e.g., inside the vehicle). Following sufficient time to allow a fob to awaken, a UHF challenge signal 44 is sent via the RF transmitter in the base station. If a fob was awakened in the desired location being polled, a UHF response signal 45 is sent from the fob RF transmitter to the base station RF receiver.

Figure 3:
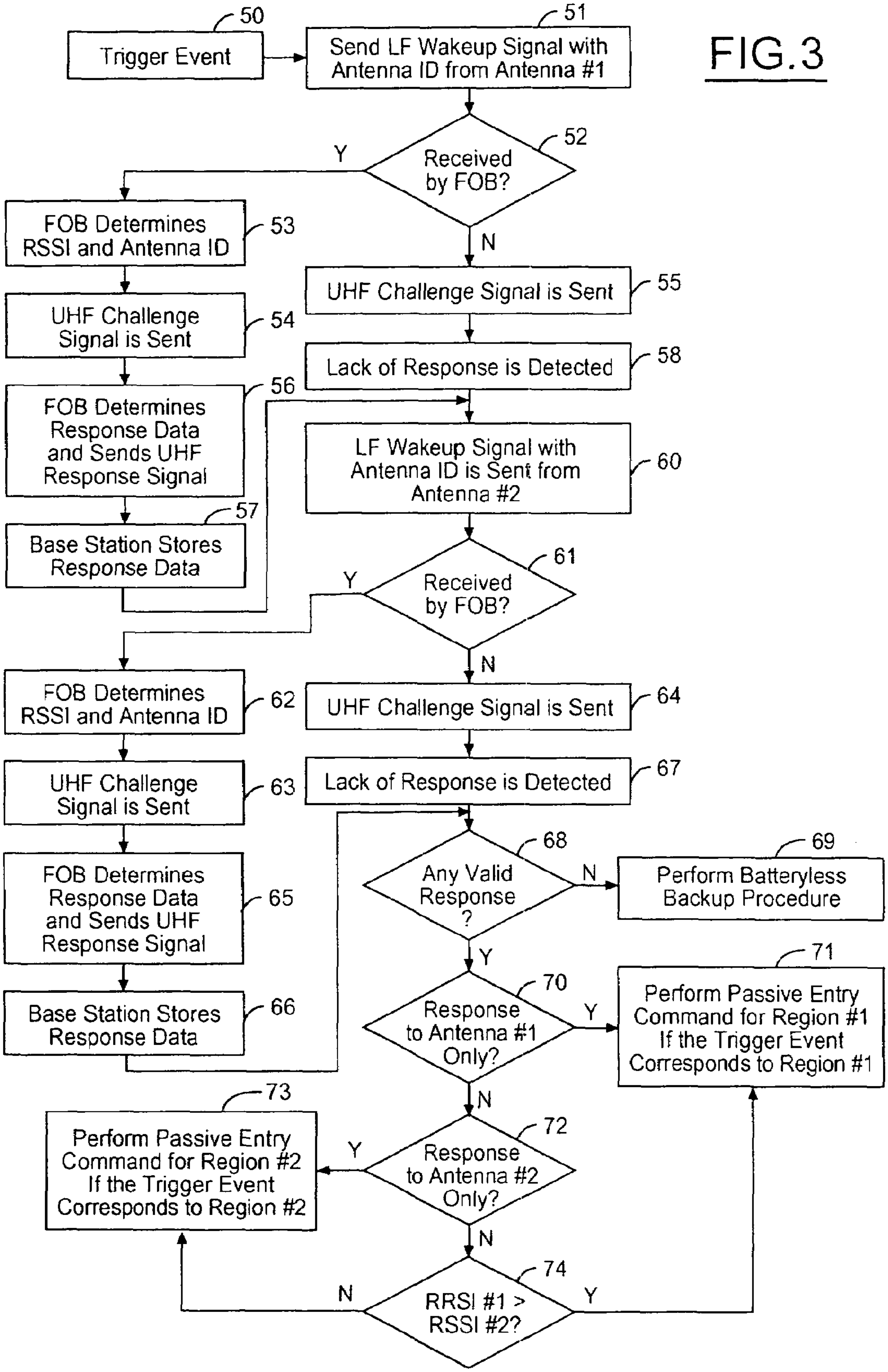
FIG. 3 is a flowchart of one preferred method of the present invention.

A preferred method of the invention is shown in greater detail in FIG. 3. This is just one possible method, and many modifications will occur to those skilled in the art. In step 50, a trigger event is generated indicating a request for a passive entry function (e.g., lifting a door handle or pressing a start button inside the vehicle). An LF wakeup signal with a corresponding antenna ID is sent in step 51 from the first antenna. At point 52, either a fob is actually present or not in the area being interrogated by the first antenna. If the LF wakeup signal is received at step 52, then the fob measures an RSSI signal and determines the antenna ID in step 53. Whether or not the wakeup signal is received, a UHF challenge signal is sent from the base station as shown at steps 54 and 55. If the UHF challenge signal is received by a fob, then the fob determines response data and sends a UHF response signal in step 56. In step 57, the base station stores the response data. If no fob was awakened or an awakened fob fails to send a valid response signal, then the lack of a response is detected in step 58.

After storing response data in step 57 or detecting that no response was received in step 58, the base station sends a second LF wakeup signal with a corresponding antenna ID in step 60 from the second antenna. If the second LF wakeup signal is received by a fob in step 61 then the fob determines RSSI data and the antenna ID in step 62. A UHF challenge signal is sent as shown in step 63 and 64 (although only one challenge signal is sent). If a fob is present, then it determines response data in step 65 and sends a UHF response signal. The base station stores the response data in step 66 or detects the lack of a response in step 67.

A check is made in step 68 to determine whether any valid response was received by a fob. If not, then either the process ends or a batteryless backup procedure may be performed at step 69 as will be described in greater detail in connection with FIG. 6. If at least one valid response was detected, then a check is made in step 70 to determine whether a valid response was received only in response to the LF wakeup signal sent from the first antenna. If so, then the person carrying the fob is known to be located in the region interrogated by the first antenna (i.e., region #1). If the requested passive entry function corresponds to region #1, then it is performed in step 71 (e.g., a door is unlocked corresponding to the first antenna area).

If the only valid response did not correspond to the first LF wakeup signal, then a check is made in step 72 to determine whether the only valid response was in response to the LF wakeup signal sent from the second antenna in step 72. If so, then the person carrying the fob is known to be located in the region interrogated by the second antenna (i.e., region #2). If the requested passive entry function corresponds to region #2, then it is performed in step 73. If two valid responses were received then a comparison is made in step 74 between the received signal strengths shown by the two responses. If the received signal strength of the first LF wakeup signal is greater then 20 the second RSSI data, then a requested passive entry command for the first region may be performed in step 71, and otherwise a requested passive entry command for the second region may be performed in step 73.

Figure 4:
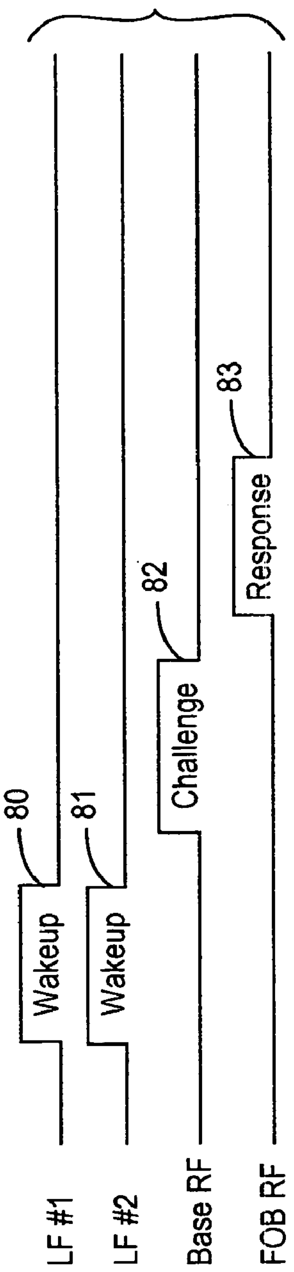
FIG. 4 is a timing diagram of signal exchanges in an alternative embodiment of the invention.
Figure 5:
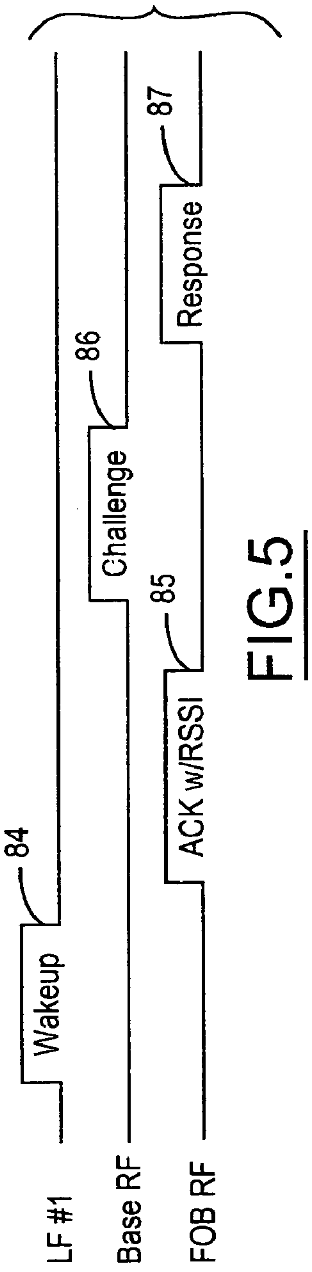
FIG. 5 is a timing diagram of signal exchanges in another alternative embodiment of the invention.

FIG. 4 shows an alternative message sequence wherein the areas interrogated by respective LF antennas do not overlap. Thus, a first LF wakeup signal 80 and a second LF wakeup signal 81 may be broadcast simultaneously. Since each LF wakeup signal includes an antenna ID, the base station will be able to determine which antenna woke up the fob. Thereafter, just a single challenge signal 82 and a single response signal 83 are necessary. Use of an antenna identifier is optional in the embodiments shown in FIG. 2, but is mandatory in the embodiment shown in FIG. 4.

In another alternative embodiment, a challenge and response sequence can be avoided in the event that a fob is not awakened by a particular LF wakeup signal. Thus, a first wakeup signal 84 is sent from a first LF transmitting antenna and if a fob is awakened then an acknowledgement signal 85 is sent by the fob RF transmitter. This acknowledgement message may also include the RSSI data. Thereafter, a UHF challenge signal 86 and a UHF response signal 87 are exchanged. Additional antenna locations may then be polled in a similar manner if desired. If no acknowledgement signal is received after the first wakeup signal, then a second wakeup signal for interrogating a second area can be broadcast immediately.

Figure 6:
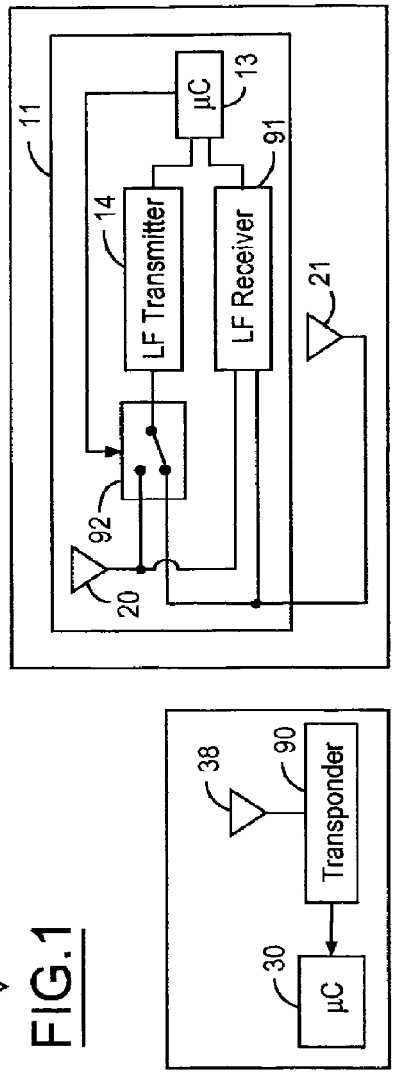
FIG. 6 is a schematic, block diagram of modified portions of a portable fob and a vehicle base station for providing LF/LF backup functionality.

If no valid responses are received from any LF wakeup signal, it is possible that an authorized fob was in the correct location but that its battery was depleted and the fob was unable to awaken. In order to provide a batteryless backup procedure, a combined two-way RKE/passive entry system having supplemental components as shown in FIG. 6 may be provided. In fob 12, the LF received function is performed by a transponder 90, which includes both a receiver and transmitter and circuitry for storing energy from an external radiated signal. Such transponders are already widely employed in engine immobilizer systems. The LF wakeup signal is of sufficient magnitude and duration that when transponder 90 is within a target area, a sufficient electrical charge is accumulated for powering transponder 90 to communicate a LF response via an internal LF transmitter for performing a passive entry function in a known manner. An LF receiver 91 is provided in base station 11 for receiving an LF response signal from transponder 90 and providing LF response data to microcontroller 13. LF receiver 91 is coupled to antennas 20 and 21. A switch 92 may be provided for sharing antennas 20 and 21 between LF transmitter and LF receiver 91.

In view of the foregoing description, the present invention has preserved the short operating range and wakeup capability of a LF system while taking advantage of the higher data rate and resistance to relay attacks of an RF system.

What is claimed is:

1. An integrated passive entry and remote keyless entry system for a vehicle, comprising:

a vehicle communication system mounted in said vehicle; and a portable fob for carrying by a user;

wherein said vehicle communication system comprises a trigger generator, an LF transmitter responsive to said trigger generator for broadcasting an LF wakeup signal, and an RF transmitter for broadcasting a UHF status message including vehicle status data to said portable fob, and wherein said vehicle communication system broadcasts a challenge signal to said portable fob after said LF wakeup signal; wherein said portable fob comprises an LF receiver responsive to said challenge signal, a fob controller for determining response data according to said challenge signal, and an RF transmitter for broadcasting a UHF response signal incorporating said response data;

wherein said portable fob further comprises an RF receiver for receiving said vehicle status data, a visual display for visually reproducing said vehicle status data, and a manual input key for activating said fob controller to generate a remote control message, wherein said RF transmitter in said portable fob broadcasts a UHF control signal incorporating said remote control message, wherein said vehicle communication system further comprises an RF receiver responsive to said UHF control signal, and wherein said vehicle communication system further comprises a base controller for initiating a corresponding remote control function in response to said UHF control signal; and wherein said LF receiver determines signal strength data of said LF wakeup signal and broadcasts said signal strength data to said vehicle communication system via said RF transmitter in said portable fob.

2. The system of claim 1 wherein said challenge signal is comprised of a UHF signal broadcast by said RF transmitter in said vehicle communication system.

3. The system of claim 1 wherein said signal strength data is included in said UHF response signal.

4. The system of claim 1 wherein said vehicle communication system includes a plurality of LF transmitter antennas at respective locations of said vehicle, wherein a respective LF wakeup signal is broadcast from each respective LF transmitter antenna, wherein said LF receiver determines respective signal strength data of each of said LF wakeup signals, and wherein said RF transmitter in said portable fob broadcasts said respective signal strength data to said vehicle communication system.

5. The system of claim 1 wherein said vehicle communication system is coupled to an engine controller in said vehicle and wherein said remote control function is comprised of a remote engine start function.

6. The system of claim 5 wherein after said vehicle communications system receives said UHF control signal for initiating said remote engine start function then said engine controller sends an engine status to said vehicle communication system and said vehicle communication system includes said engine status in said UHF status message.

7. The system of claim 1 wherein said remote control function is comprised of a door lock function and wherein said vehicle communication system includes a door lock status in said UHF status message.

8. An integrated passive entry and remote keyless entry system for a vehicle, comprising:

a vehicle communication system mounted in said vehicle; and a portable fob for carrying by a user;

wherein said vehicle communication system comprises a trigger generator, an LF transmitter responsive to said trigger generator for broadcasting an LF wakeup signal, and an RF transmitter for broadcasting a UHF status message including vehicle status data to said portable fob, and wherein said vehicle communication system broadcasts a challenge signal to said portable fob after said LF wakeup signal; wherein said portable fob comprises an LF receiver responsive to said LF wakeup signal, a fob controller for determining response data according to said challenge signal, and an RF transmitter for broadcasting a UHF response signal incorporating said response data;

wherein said portable fob further comprises an RF receiver for receiving said vehicle status data, a visual display for visually reproducing said vehicle status data, and a manual input key for activating said fob controller to generate a remote control message, wherein said RF transmitter in said portable fob broadcasts a UHF control signal incorporating said remote control message, wherein said vehicle communication system further comprises an RF receiver responsive to said UHF control signal, and wherein said vehicle communication system further comprises a base controller for initiating a corresponding remote control function in response to said UHF control signal; and wherein said portable fob further comprises a battery for powering said fob controller, said RF receiver, and said RF transmitter, wherein said LF receiver in said portable fob is comprised of a transponder capable of LF reception and LF transmission based on energy from an external radiated signal, wherein said vehicle communication system broadcasts an LF interrogation signal to said transponder in response to lack of said UHF response signal, and wherein said transponder broadcasts an LF response signal in response to said interrogation signal.

9. A method of operating a combined two-way RKE/passive entry system utilizing a portable fob carried by a user and a vehicle base station mounted in a vehicle, wherein said portable fob includes a visual display for displaying vehicle status information, said method comprising the steps of: a user interacting with said vehicle in order to generate a trigger event; broadcasting an LF wakeup signal from said vehicle base station to said portable fob in response to said trigger event; broadcasting a UHF challenge signal from said vehicle base station to said portable fob; determining response data in said portable fob in response to said UHF challenge signal; broadcasting a UHF response signal including said response data from said portable fob to said vehicle base station; broadcasting a UHF remote control message from said portable fob to said vehicle base station in response to manual activation of a corresponding switch element on said portable fob; and broadcasting a UHF status message from said vehicle base station to said portable fob including vehicle status data; and further comprising the step of said portable fob determining signal strength at which said LF wakeup signal is received, wherein data representing said signal strength is broadcast by said portable fob to said vehicle base station.

10. The method of claim 9 wherein an LF receiver in said portable fob is comprised of a transponder capable of LF reception and LF transmission based on energy from an external radiated signal, said method further comprising the steps of: in response to a failure to receive a valid UHF response signal, broadcasting an LF interrogation signal to said transponder; and broadcasting a transponder-based LF response signal from said portable fob to said vehicle base station in response to said LF interrogation signal.

11. A combined passive entry and remote keyless entry system for a vehicle having a component that can be manually manipulated and a remote control function that can be initiated, the combined passive entry and remote keyless entry system comprising:

a portable fob that is adapted to be carried by a user, said portable fob including:

a manual input key tat is adapted to generate a remote control function signal;

a receiver that is adapted to receive a wakeup signal, a challenge signal, and a status signal;

a controller that is responsive to (1) said wakeup signal for receiving said challenge signal, (2) said challenge signal for determining a response signal, and (3) said remote control function signal for determining a remote control signal; and a transmitter for generating said response signal and said remote control signal; and a display for generating a visual representation that is indicative of said status signal; and a vehicle communication system that is adapted to be provided within a vehicle, said vehicle communication system including:

a trigger signal generator that is adapted to generate a trigger signal in response to manual manipulation of a component of a vehicle;

a receiver that is adapted to receive said remote control signal and said response signal;

a controller that is responsive to (1) said remote control signal for initiating the remote control function in the vehicle and (2) said response signal for initiating the remote control function in the vehicle; and a transmitter that is responsive to (1) said trigger signal for initially generating said wakeup signal and subsequently generating said challenge signal, (2) said remote control signal for initiating a remote control function in the vehicle, and (3) the initiation of the remote control function in the vehicle for generating said status signal;

wherein said portable fob receiver determines signal strength data of said wakeup signal and generates said signal strength data to said vehicle communication system.

12. A combined passive entry and remote keyless entry system for a vehicle having a component that can be manually manipulated and a remote control function that can be initiated, the combined passive entry and remote keyless entry system comprising:

a portable fob that is adapted to be carried by a user, said portable fob including:

a manual input key that is adapted to generate a remote control function signal;

a receiver that is adapted to receive a wakeup signal, a challenge signal, and a status signal;

a controller that is responsive to (1) said wakeup signal for receiving said challenge signal, (2) said challenge signal for determining a response signal, and (3) said remote control function signal for determining a remote control signal; and a transmitter for generating said response signal and said remote control signal; and a display for generating a visual representation that is indicative of said status signal; and a vehicle communication system that is adapted to be provided within a vehicle, said vehicle communication system including;

a trigger signal generator that is adapted to generate a trigger signal in response to manual manipulation of a component of a vehicle;

a receiver that is adapted to receive said remote control signal and said response signal;

a controller that is responsive to (1) said remote control signal for initiating the remote control function in the vehicle and (2) said response signal for initiating the remote control function in the vehicle; and a transmitter tat is responsive to (1) said trigger signal for initially generating said wakeup signal and subsequently generating said challenge signal, (2) said remote control signal for initiating a remote control function in the vehicle, and (3) the initiation of the remote control function in the vehicle for generating said status signal;

wherein said vehicle communication system includes a plurality of transmitter antennas adapted to be provided at respective locations of the vehicle, a respective wakeup signal is broadcast from each of said plurality of transmitter antennas, said receiver determines respective signal strength data of each of said LF wakeup signals, and wherein said RF transmitter in said portable fob broadcasts said respective signal strength data to said vehicle communication system.

* * * * *

UNITED STATES PATENT AND TRADEMARK OFFICE

CERTIFICATE OF CORRECTION

PATENT NO. : 7,388,466 B2
APPLICATION NO. : 10/999503
DATED : June 17, 2008
INVENTOR(S) : Riad Ghabra et al.

It is certified that error appears in the above-identified patent and that said Letters Patent is hereby corrected as shown below:

Column 7, line 7 - delete “challenge” and insert --LF wakeup--

Column 9, line 3 - delete “tat” and insert --that--

Column 10, line 28 - delete “tat” insert --that--

Signed and Sealed this

Nineteenth Day of August, 2008

JON W. DUDAS
*Director of the United States Patent and Trademark Office*